United States Patent [19]

Kelley et al.

[11] Patent Number: 5,604,901
[45] Date of Patent: Feb. 18, 1997

[54] INTERROGATION INDEX FILE COMPARISON

[75] Inventors: Edward E. Kelley, Wappingers Falls; John F. Paleveda, Pleasant Valley, both of N.Y.

[73] Assignee: International Business Machines Corporation, Armonk, N.Y.

[21] Appl. No.: 538,377

[22] Filed: Oct. 3, 1995

Related U.S. Application Data

[63] Continuation of Ser. No. 867,950, Apr. 13, 1992, abandoned.

[51] Int. Cl.$^6$ ............................................. G06F 17/30
[52] U.S. Cl. ............................................. 395/603; 395/607
[58] Field of Search ..................... 395/600; 364/419.19

[56] References Cited

U.S. PATENT DOCUMENTS

| | | | |
|---|---|---|---|
| 3,609,703 | 9/1971 | Peacock | 340/146.2 |
| 3,670,310 | 6/1972 | Bharwani | 395/603 |
| 4,053,871 | 10/1977 | Vidalin et al. | 340/146.2 |
| 4,408,273 | 10/1983 | Plow | 395/618 |
| 4,443,860 | 4/1984 | Vidalin | 395/601 |
| 4,524,427 | 6/1985 | Vidalin et al. | 395/606 |
| 4,641,274 | 2/1987 | Swank | 395/793 |
| 4,679,139 | 7/1987 | Durbin | 395/601 |
| 4,807,182 | 2/1989 | Queen | 395/772 |
| 4,912,637 | 3/1990 | Sheedy et al. | 395/619 |
| 5,072,367 | 12/1991 | Clayton et al. | 395/603 |
| 5,129,082 | 7/1992 | Tirfling et al. | 395/603 |
| 5,218,696 | 6/1993 | Baird et al. | 395/601 |
| 5,237,678 | 8/1993 | Kuechler et al. | 395/605 |
| 5,261,087 | 11/1993 | Mukaino | 395/603 |
| 5,261,091 | 11/1993 | Yumama | 395/604 |
| 5,274,802 | 12/1993 | Altine | 395/618 |
| 5,341,498 | 8/1994 | Conner et al. | 395/615 |
| 5,369,762 | 11/1994 | Wolf | 395/600 |
| 5,377,348 | 12/1994 | Lau et al. | 395/600 |

*Primary Examiner*—Thomas G. Black
*Assistant Examiner*—Paul R. Lintz

[57] ABSTRACT

A method of comparing files takes three passes through data tables in memory to generate tables containing pointers to matches and mismatches by employing a method of keyword-index translation in which a keyword is taken from a first data table in a first pass and used as the index in loading an index table containing a pointer to the record containing that keyword. In a symmetric operation, a keyword is fetched from one table and used to interrogate the corresponding index table in a second pass. If there is a match, the record in the index table contains the pointer; and if there is a mismatch, the record contains a null. In an optional third pass, keywords are fetched from the other table and used to find records in the other table that are mismatches.

52 Claims, 8 Drawing Sheets

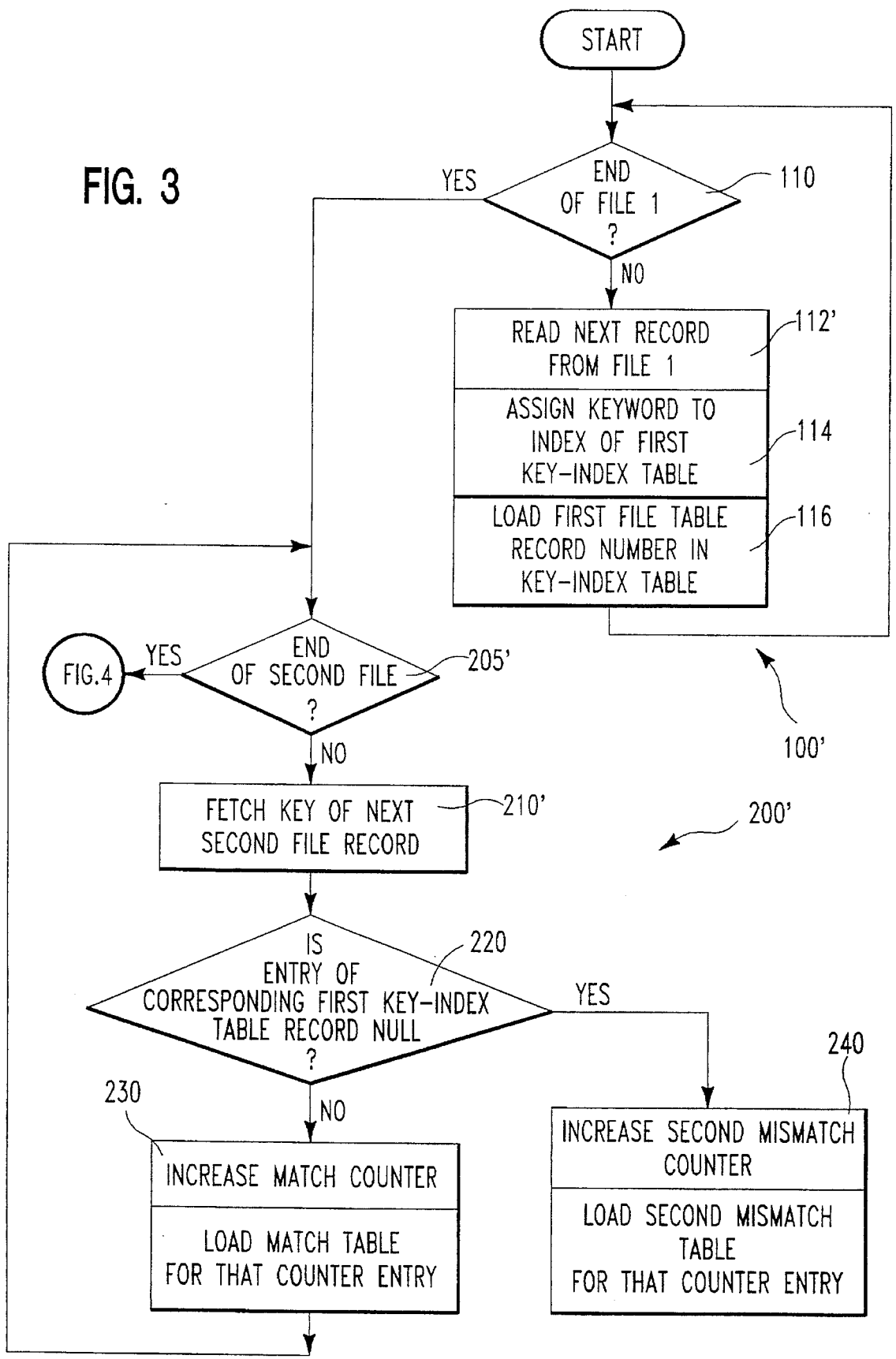

INTERROGATION INDEX FILE COMPARISON

This application is a continuation of application Ser. No. 07/867,950 filed Apr. 13, 1992 and now abandoned.

FIELD OF THE INVENTION

A field of the invention is that of data processing in general purpose computers, in particular the field of comparing data in different files to find matches and mismatches.

BACKGROUND ART

Many techniques have been developed in the art in order to compare files of data that are nominally the same. A brute force technique requires that each record in a first file be compared with every record in a corresponding second file. The time required to make this comparison is on the order of $N^2$ where N is the number of records in the files.

One technique known in the art is that illustrated in the IBM Technical Disclosure Bulletin 06-77, pp 387–388, which uses the technique of multiple pointers to determine the minimum difference between files. Next points are compared with current points to decide Insert, Delete, or Replace action.

SUMMARY OF THE INVENTION

The invention relates to a method of comparing data files that requires only two passes through one file and one pass through the other file. In a first pass a key word from a source record in the first file is used to define the index element of a record in a corresponding key-index file, the record element of which is a pointer to the source record.

In the second pass of the operation, a key word is sequentially read from the second file; a corresponding second key-index file is defined; an index translation or substitution process is performed in which the keyword from the second file is used to interrogate the key-index file derived from the first data file; and the record element labeled by that keyword index is tested. If the record is null, then a mismatch has been identified; i.e. there is no record in the first file corresponding to the record being processed in the second file. If the contents are not null, then there has been a match. In a third pass, the index lookup is repeated by reading keywords from the second file and interrogating a key-index file based on the first file.

An advantage of the method is that it employs the fast built-in routines that are provided with the compiler or interpreter for the high level language being used and/or by the operating system of the general purpose computer being used.

An advantageous feature of the invention is that the range of the index need not be defined in advance.

A feature of the invention is that it takes advantage of a feature provided in some high level languages that permits the use of an alphanumeric index to a table or vector. This permits the use of alphanumeric keywords as the index in the key-index table and broadens the class of files that can be compared with this technique.

Another feature of the invention is that the tables need not be sorted.

Another feature of the invention is that a large key may be used.

Another feature of the invention is that the key may be selected from free form text.

BRIEF DESCRIPTION OF DRAWINGS

FIGS. 3 and 4 illustrate an alternative version of the portion illustrated in FIG. 2.

BEST MODE OF CARRYING OUT THE INVENTION

In the field of data processing, it is important for efficiency to reuse routines, especially fast routines that have been optimized. One such routine is the utility routine that accepts as input the index value of some ith element in an array, N(i), $N_i$, $N^i$, say, and returns the contents of the array element pointed to by that index value. The term index will be used here to refer to a subscript, superscript, or other pointer to one element in an ordered set of elements. The terms index element or index value will be used to refer to a particular element of the set of indices and to the value of a particular element. When the expression Test=N(4) is used in a program, it means that a utility routine takes the value of the 4th element of vector N and places it in the memory location reserved for test. This is a convenient way to program a lookup function that will be executed more quickly than a corresponding routine written in a high level language.

In the invention disclosed here, the utility routine written for the language REXX, an interpreted or compiled language available from IBM for use in general purpose computers, is used to advantage in a file comparison routine. As will be disclosed below, a value "test" is fetched from a corresponding file using a built in lookup routine that operates on a keyword that uniquely specifies a record; i.e. test=N(Keyword), fetching a value for test from that element of array N pointed to by the value of the symbol "Keyword".

In operation, the method is carried out by a comparison that involves four tables in the computer memory. The first two tables, [TABL1(i) and TABL2(i)] contain the data being compared. They are formed by reading in at least the keyword of the raw first and second data files being compared. TABL1 may illustratively be a conventional table for which the index element is the number of the record in a set of records that are sequentially stored in memory. The corresponding "key-index" files (KEY1(key) and KEY2(key)) have one record for each record in the data file that they correspond to [KEY1 has one record for every record in TABL1, etc.]. The content of that record in the key-index file is the record number of the corresponding table record. The index "key" to the record in question is the keyword of the corresponding table record. For example, if the 27th record in TABL1 has the keyword SAM, the corresponding record in KEY1 has the value 27 and is pointed to by the index SAM.

There is symmetry between KEY1 and TABL1: the index element in TABL1 is the record element in KEY1 and the subset of the record element that is the keyword in TABL1 is the index element in KEY1. There need not be symmetry in record location. In the preceding example, there is no need for the record in KEY1 that has the index SAM to be the 27th in a sequence of record elements. As will be discussed below, the correlation between index element and memory location may be carried out in more than one way.

Figure 1:
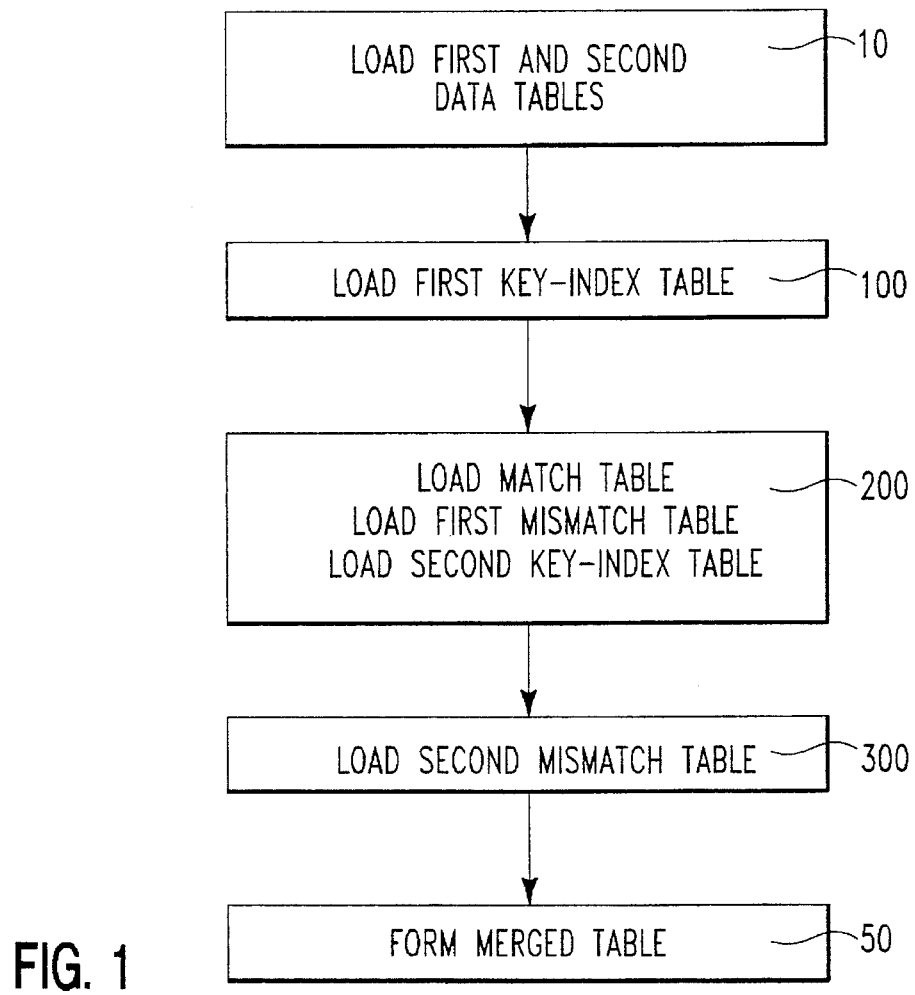
FIG. 1 illustrates an overall flow chart of a method according to the invention.
Figure 1A:
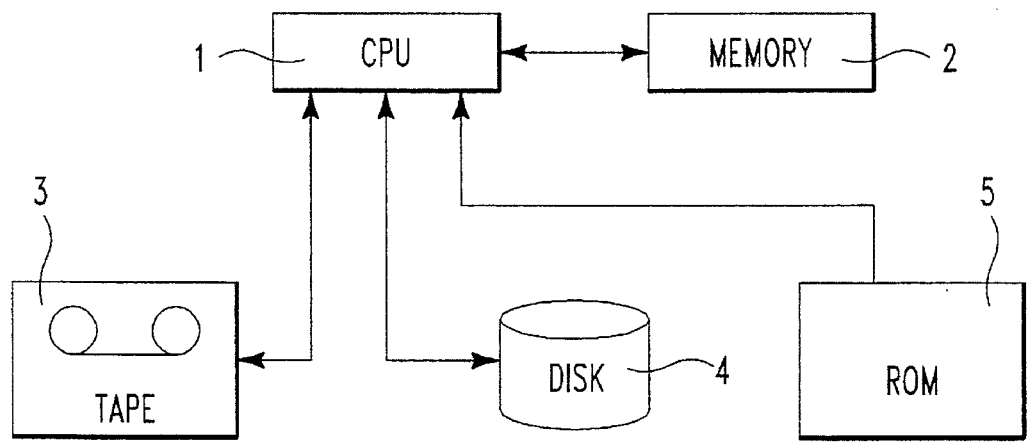
FIG. 1A illustrates a schematic of the system in which the invention is practiced.

Referring now to FIG. 1, there is shown an overall flow chart illustrating the practice of the invention. FIG. 1A depicts a schematic representation of a general purpose computer system for operating software to perform the method. In the system of FIG. 1A, CPU 1 passes data to and from tape drive 3 and/or disk drive 4, or non-volatile memory 5, such as ROM or EPROM (collectively called non-volatile storage) and into and out of memory 2.

In FIG. 1, the first block, labeled 10, represents an initialization step in which the first and second files to be compared are read from mechanical storage, such as a tape or disk, into first and second file tables (TABL1 AND TABL2) in the computer memory. Both files need not have the same structure. There may be a corresponding keyword that uniquely identifies a particular record, but it need not be located in the same location in both files; e.g. the key may be a surname, street and zip code, which may be located in different portions of the records in the two files and pulled out in the process of defining the keyword.

In the block denoted by the numeral 100, the data in the first file table is looped through in the first pass. The keyword of the nth file record in the first file table is assigned as the index of an nth element of a key-index table or list, KEY1, in which nth element the value n is placed as the data, or the record element.

The second pass through the data is through the second file table, in the course of which, the keyword of the nth record from the second file is used as the index value in the first key-index table. If the record element in the first key-index table pointed to by that index value is null, it indicates that there is no record in the first table corresponding to the current record from the second table. In that case, a mismatch table (TMIS2) is loaded with relevant data. If there is a non-null entry, then there is a match and a similar table (MATCH) is loaded, typically with the record number of the matching records.

The third pass is through the first table again, looking for mismatches in which a first-table entry has no counterpart in the second table. The same process is followed using a second keyword table derived from TABL2. At the end of the third pass, there are three tables, the match table and the first and second mismatch tables, that contain the data on the relation between the files. A final step uses the data generated in the preceding steps as is appropriate for the task at hand. If the purpose is to identify new records that have been added in the two files, then the records added in the second mismatch table can be added to the first file (or vice versa). If the purpose is identification of errors, then the records in the mismatch files will be checked for typographical errors, etc. before a final file is generated. If the purpose is to find common records in the two files, only the MATCH table will be of interest.

Figure 2A:
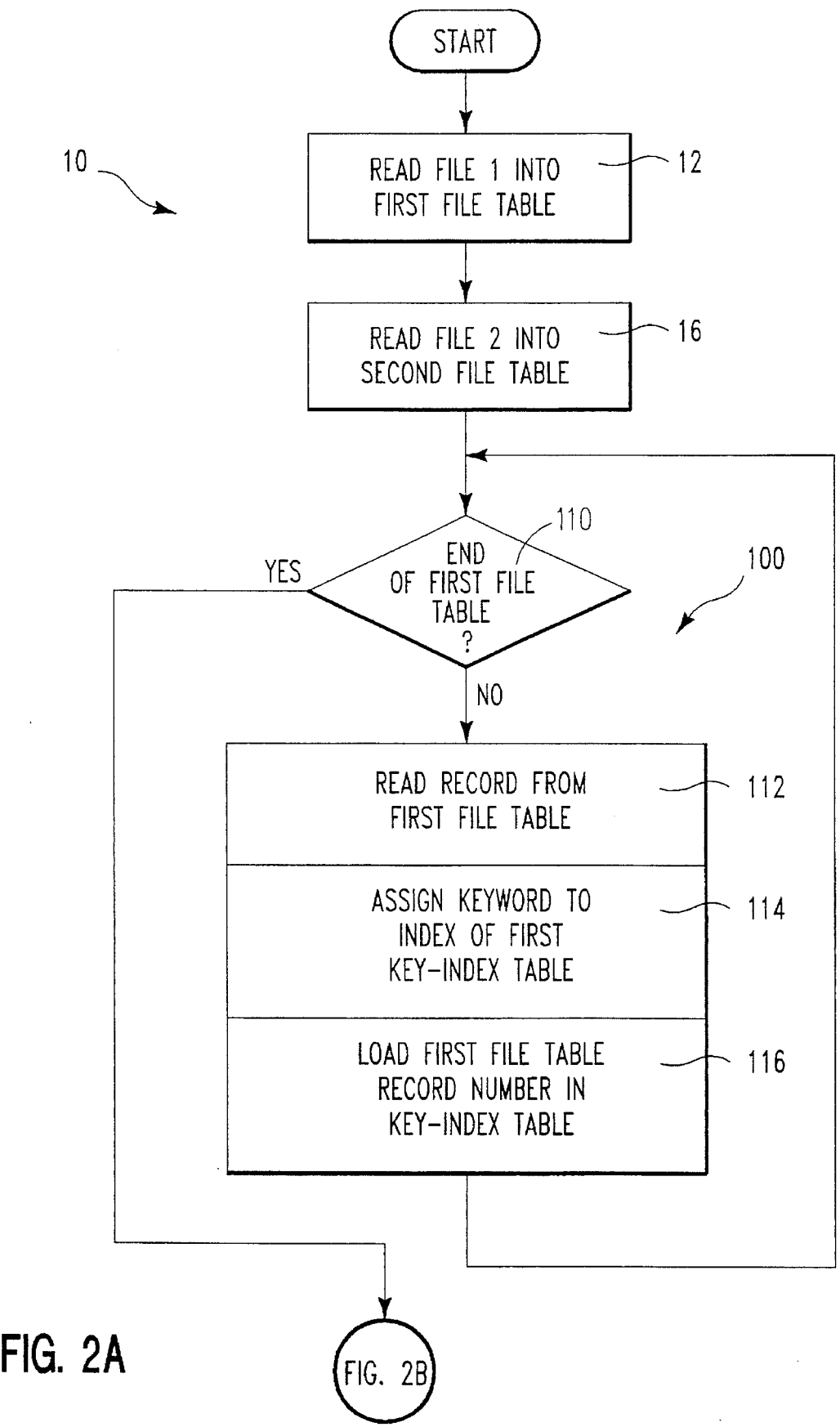
FIGS. 2A–2C illustrate details of the flow chart of FIG. 1.
Figure 2B:
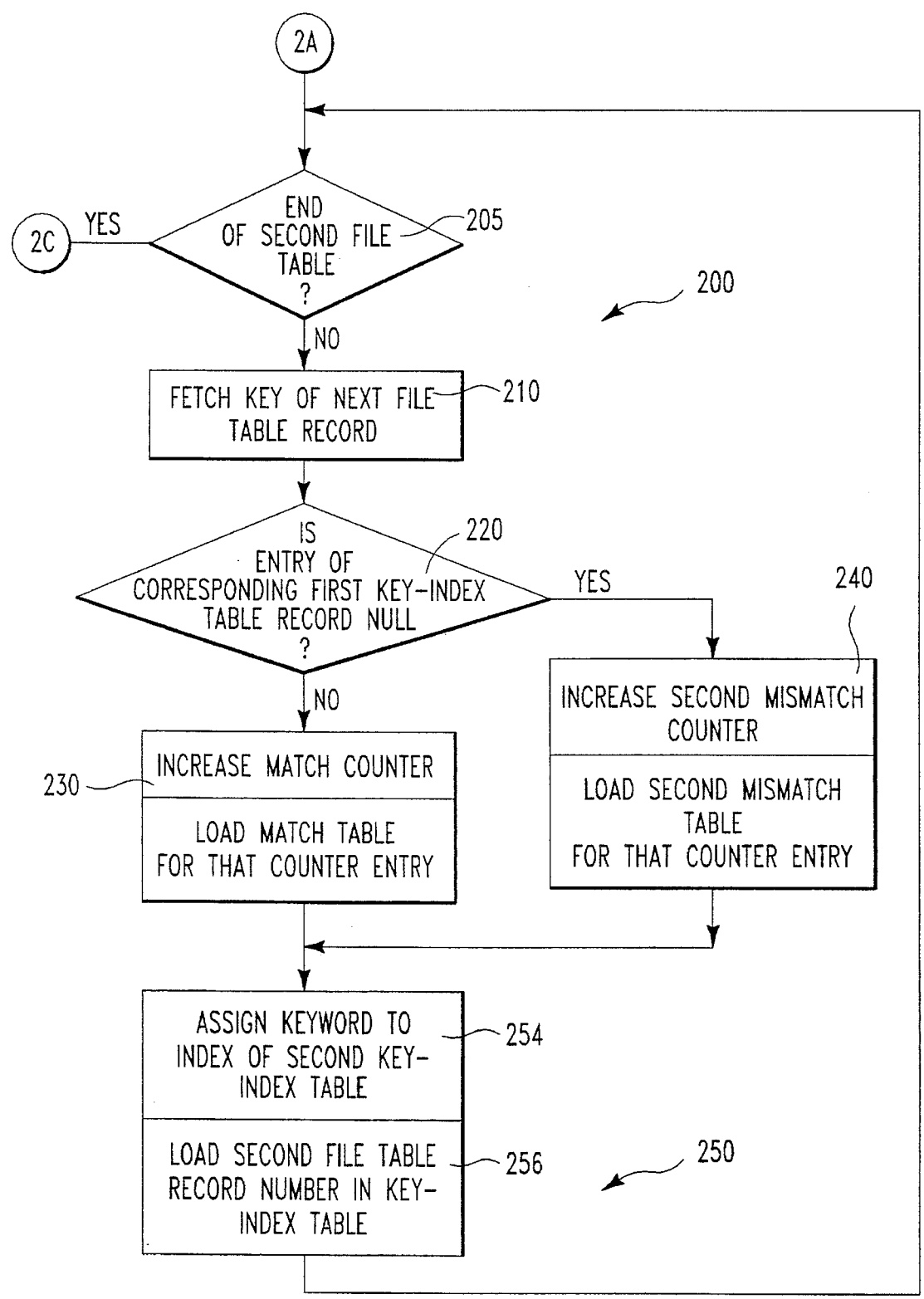
Figure 2C:
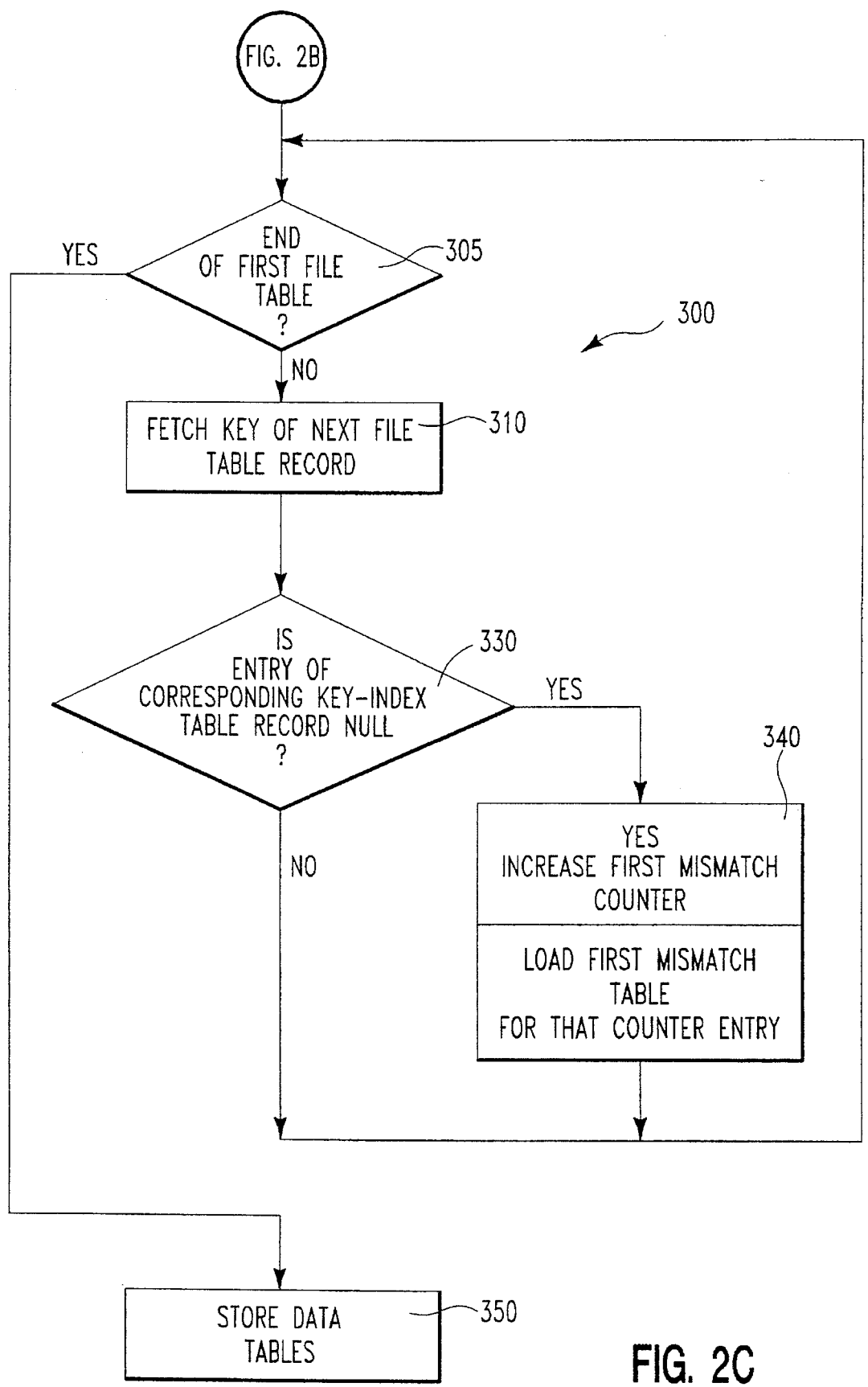

Referring now to FIGS. 2A–2C, the steps of FIG. 1 are shown in more detail. The block of steps denoted with the numeral 10 in FIG. 2A is an initializing step in which the files are read from external storage into tables in main memory. It is not necessary to load the entire file into memory if the comparison can be made by a smaller keyword that is a subset of a record. It is not necessary that the keyword be a defined field in a record. Keywords could be made on the fly by defining certain characters or fields of a record as a keyword and reading only the necessary data into memory.

In the loop denoted by the numeral 100, the data in the first file table is looped through. The keyword of the nth file record in the first file table (read in step 112) is assigned as the index of an element of KEY1 (step 114), in which element the value n is placed as the data, or record element (step 116). The method of assigning that number to a memory location does not matter for the practice of the invention and those skilled in the art will readily be able to devise satisfactory methods. For example, in an interpreted language, KEY1 could be treated as a group of variables, and a memory location could be assigned to each element of KEY1 as it is encountered in the course of program execution, without regard for any relationship between the members of the group. For example, KEY1(SAM) need not be between KEY1(SAK) and KEY1(SAP) and the locations may be assigned by whatever memory allocation algorithm is used for variables that are not part of a "table". In particular, there is no need for the elements of KEY1 to be located contiguously in memory, as was the case for vectors in FORTRAN and other languages of that generation. On the other hand, if the designers of a compiler or interpreter prefer, a memory block may be set aside and elements of KEY1 placed there in sequence according to the sequence in which they appear in the course of running the program, with a lookup table to take care of the link between SAM and the correct memory location. The invention may be practiced with any language that meets the requirements of returning a data element in response to a pointer or index element.

Referring now to FIG. 2B, blocks 200 and 250 show the second pass through the data, in which each record of the second file table is tested against the first file table. For convenience in terminology, the term "repetitively fetching" or sequentially fetching will be used to refer to this process. The records of the second file are stepped through in any convenient order and the keyword of the each record in the second file is fetched from TABL2 and used to fetch the contents of a corresponding record in the first key-index file; e.g. KEY1(keywordn) is the data stored in the element of KEY1 that has the index value given by the nth keyword (keywordn) in the second file table. The contents of that element of the first key-index file table are tested to determine if there is a match or a mismatch between the two files. For convenience in terminology, and consistent with usage in the field, the terms "interrogate", "query" or "test" will be used to describe this and equivalent processes in which a value is fetched from memory by going to the appropriate memory location, fetching the value there and comparing it with some criterion. In the setup procedure, the KEY1 table is first loaded with a flag such as null. In an earlier step in FIG. 2A, the record number of a record (i, say) in the first file was loaded into the element of KEY1 that has as index element value the keyword of the ith record in the first file table. In the case of a match between the ith record of TABL1 and the nth element of TABL2, the value of KEY1(Keyindexn) will be i. If there is a mismatch, then a query as to the value of KEY1(keyindexn) will return the value null that was loaded in the initialization step. An IF statement may be used to query whether the value of the element in the key-index table being queried is equal to the flag.

For example, if the keyword of a personnel record is the Social Security number of an employee and the record having keyword (123-45-6789) is the 7th record of TABL1 and the 9th record in TABL2, then KEY1(Keyindexn)= KEY1(Keyindex9) since the current record is the 9th record of TABL2. Plugging in the value of the 9th index, we interrogate KEY1 and find that the contents of KEY1(123-45-6789)=7. Thus, we know that there is a match between the 7th record of TAXBL1 and the 9th record of TABL2. If there has been a mismatch in that there is no corresponding element in the first file that has the keyword (123-45-6789), then the contents are equal to the null flag that was loaded into the KEY1 array in the initialization procedure.

Effectively, there has been a translation or substitution in which the keyword (which is part of the data) from the first file is translated to give an index value for an element in a corresponding table of data taken from a second file. The preceding statement may be paraphrased as that there has been a role shift —a portion of the data in one file or table is used as the pointer or index element in another table.

Referring again to FIG. 2B, the contents of the key-index record are tested in block 220 and which of the two alternative steps following the test on the key-index table is used depends on whether there has been a match or not. If there has been a match, then the steps in block 230 are followed; a match counter is increased by 1 (to k, say) and the kth record in a match table is loaded with the record numbers (in the file table or in the tape or disk file) of the matched data (n and i), as pointers to the matching records. If the element was a null, indicating a mismatch, then a corresponding second mismatch counter (indicating a record in the second file that did not have a matching record in the first file) is incremented and a corresponding second mismatch table is loaded with the number of the record in the second file that did not have a corresponding record in the first file, as a pointer to the non-matching record. Since the relevant data is at hand, this is a convenient time to load KEY2, the second key-index file, in block 250. The computer then loops back to the start of block 200 and continues until it reaches the end of the first second table.

The third pass is taken through the first file table to look for mismatches i.e., elements of the first file that do not have corresponding data in the second file. Since the matches have been identified on the second pass, it is not necessary to look at them a second time. Similar steps are performed in block 300 of FIG. 2C to those of block 200, with corresponding steps being indicated by corresponding numerals. At the end of this pass, three new tables have been generated; a match table MATCH and two mismatch tables TMIS1 and TMIS2. These tables are then stored for further processing, typically an examination of the mismatched data and a merge of the two files into a final corrected file. Data stored contain a representation of the relationship between a record in the first and second files. A match is represented by the number in the MATCH file and a mismatch is represented by a number in the mismatch table TMIS1 or TMIS2.

Figure 4:
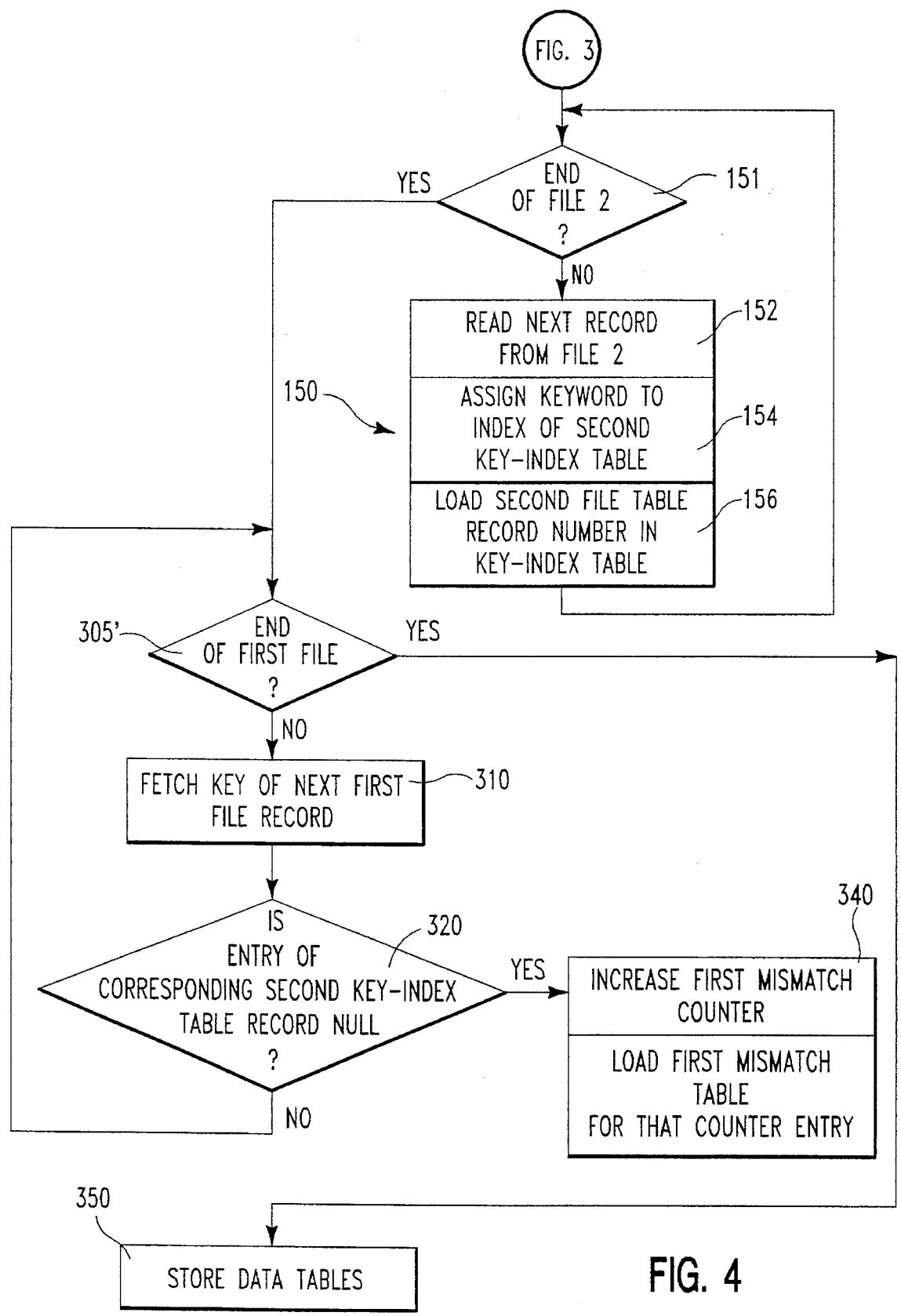

It has been assumed that there is enough memory to hold the first and second data tables, TABL1 and TABL2, the first and second key-index tables, KEY1 and KEY2, and the three match tables. Referring now to FIGS. 3 and 4, there is illustrated an alternative version of the invention. In this alternative, it is assumed that the limitation is computer memory, and the two data tables TABL1 and TABL2 are not used. The two key-index tables are formed in memory, but the tape or disk will have to be read again in order to make the comparison.

Referring now to FIG. 3, a corresponding section 100' corresponding to section 100 of FIG. 2A is illustrated. Corresponding substeps are indicated by the same numeral as that of FIG. 2A and are not described further. After KEY1 has been loaded, the data from the second file is read in sequentially (205') in a second pass. The keyword is retrieved; the same keyword to index translation is performed; the Match counter or the First mismatch counter is incremented; and the appropriate data are stored in MATCH and TMIS2. At the end of the second pass, the method proceeds to the steps illustrated in FIG. 4, in which a third pass is performed in block 150 to form the KEY2 table. The first file is then read through in a fourth pass to identify second mismatches—those records in the first file that do not have counterparts in the second file.

Those skilled in the art will appreciate that the embodiment of FIGS. 3 and 4 saves memory at the expense of two extra passes through the mechanical operation of reading in the data from disk or tape—an operation that takes considerably more time than reading a table in memory.

Figure 5:
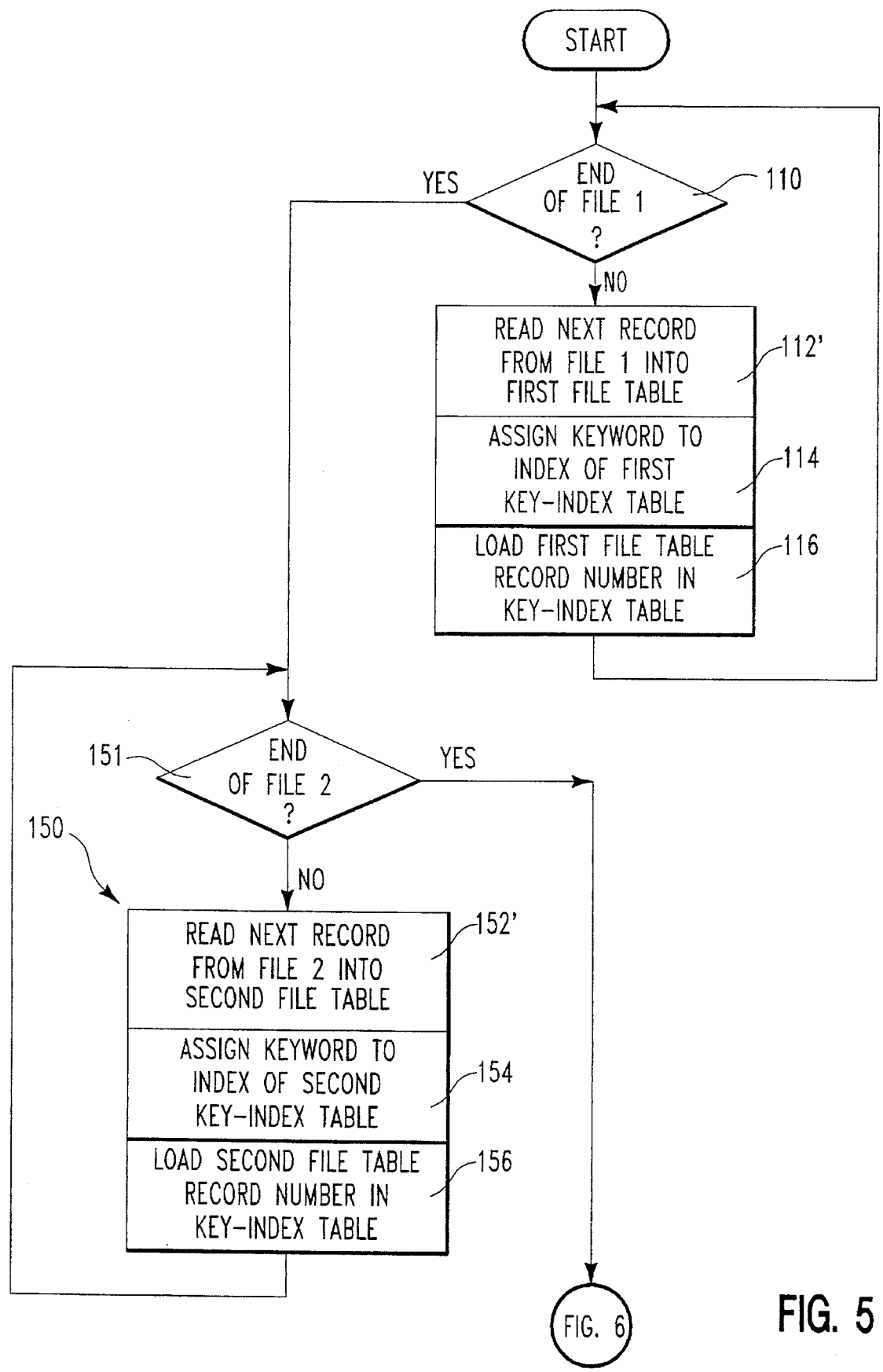
FIGS. 5 and 6 illustrate another alternative method of practicing the invention.
Figure 6:
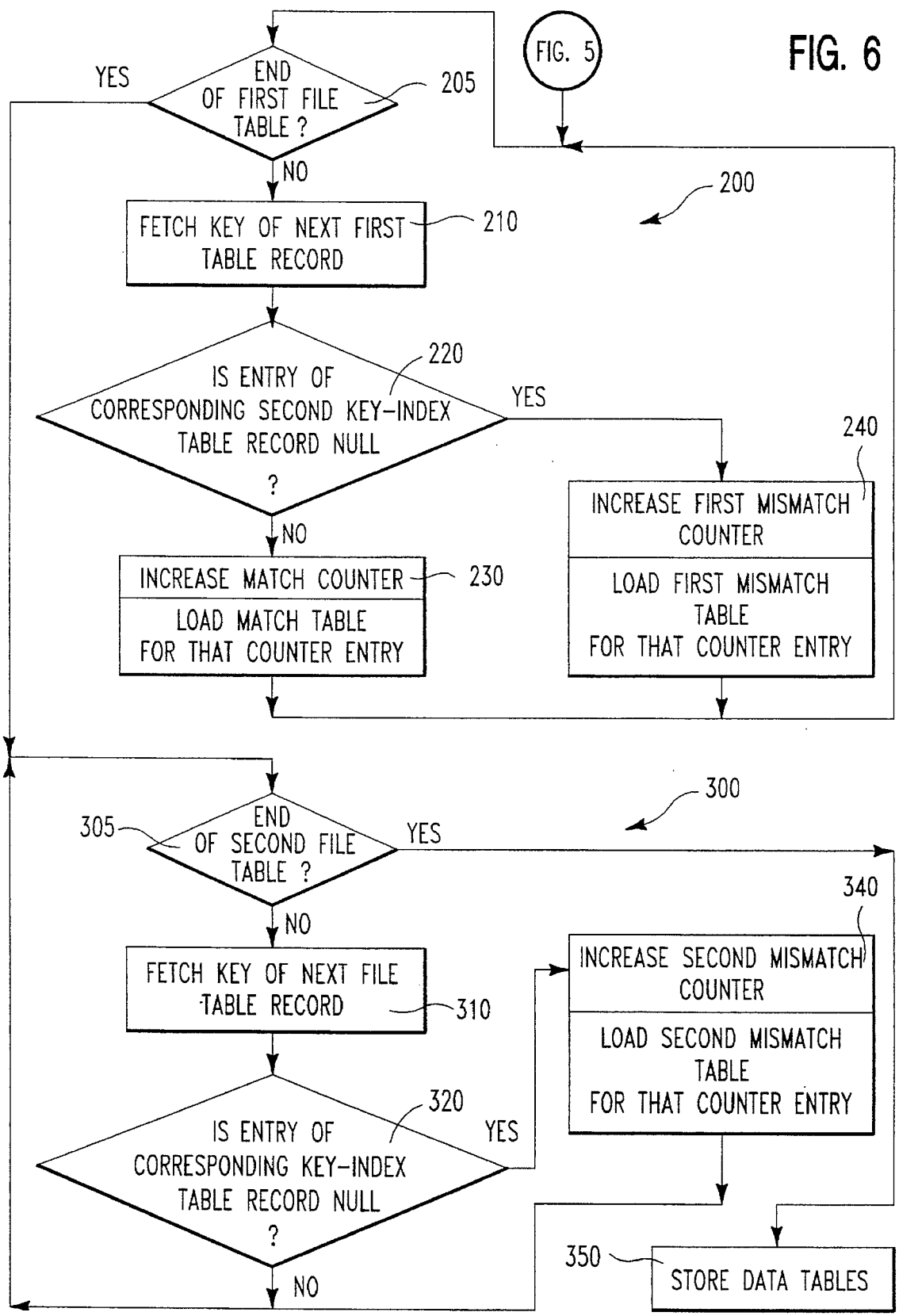

The embodiments of FIGS. 5 and 6 illustrate yet another version of the invention suited to hardware in which the operation of the tape or disk is sufficiently slow relative to the memory operations that it is possible to define the key-index tables in the same pass as the mechanical read operation; i.e. that the key-index tables can be loaded in time that would be spent waiting for the disk drive to respond. The records in the file are read sequentially into the first file table (112). While the data is in the CPU, the step of assigning a key word to the index of the first key-index table is performed (114) and that element of the first key-index table is loaded with the number of the record that has just been read from the external file 1 (116). Depending on the hardware being used, this method may save time if it is possible to perform the table assignments without delaying the mechanical process of reading a tape or reading a disk. The second portion of FIG. 5 illustrates a corresponding assignment of the second key-index table from file 2.

The comparison steps of FIG. 6 are similar to those of FIGS. 2A and 2B, with the omission of steps 254 and 256. The steps in block 200 are performed in a pass through TABL1 and those in block 300 are performed in a pass through TABL2.

The invention may be most advantageously practiced with alphanumeric indices because these afford the most flexibility. An example is the use of an automobile license plate label to identify cars that are allowed to park in a parking lot or for the police to identify the owner of a car that they have under observation. In these examples, the second file has only one element, so that if it is known that the element in the second file is in the first file, the operation is effectively that of a search to locate the record in question.

Those skilled in the art will readily be able to devise modifications of the inventive method. For example, it may be of interest to find out if a small set of data are included in a larger set; i.e. only the matches are of interest, so that only the larger key-index table is needed and the smaller key-index table and the mismatch tables need not be loaded. In such a case, there would be one pass through the main table to load the first key-index table and one pass through TABL2 to identify the matches. Depending on the allocation of overhead to tables, it may be preferable to use a single two dimensional table for the functions of TABL1, TMIS1, and MATCH instead of three one dimensional tables. For example TABL1'(N, KEY) and TABL2'(N, KEY) could be used where the index N is the number of the record in the data file (as is used in TABL1) and the index KEY is the keyword of that record (as is used in KEY1). The nth record in TABL1' could include: KEY and N2, where KEY is the keyword and N2 is the number of the record in TABL2' that matches this record or is null for no match. The nth record in TABL2 would have a KEY and a corresponding N1. The steps of FIG. 2B would be altered to step through TABL2' and interrogate TABL1' with the keyword (and vice versa for the steps of FIG. 2C).

As an additional example, the invention may be used to search text files. A language that permits a lengthy index, such as REXX (index limit of 241 characters), can use a sentence, paragraph or collection of words as the keyword. Thus, the invention is not limited to data files that have a conventional structure of records delimited into fields; or to fields that have a conventional keyword such as a Social Security number, serial number, etc. Further, the characters that form the keyword need not be contiguous in the file record. With a permitted record length of 64K characters, it is possible to use a "custom" keyword made for the search by selecting appropriate identifying segments of the record. Variable length keywords may be constructed when the data such as names of individuals or streets varies.

Further, a range can be defined for the keyword by incorporating a test in the step of defining the keyword; e.g. testing for employees within an age range could be accomplished by using IF (age>xx AND age<yy) THEN key=A, ELSE key=B or any number of tests known to those skilled in the art.

The invention may be practiced in modified form with computer languages such as FORTRAN or BASIC that do not provide for the use of alphanumeric indices for arrays. In that case, a supplementary translation operation is used to translate from the alphanumeric keyword to a numeric counterpart. For example, a license plate AB 123 could be translated to 0102123, with the substitution of the position of the letter in the alphabet for the letters A and B. Those skilled in art will readily be able to formulate translation schemes that provide for more efficient conversion than this simple example.

The following pseudo code, oriented to the REXX language, illustrates the steps of FIGS. 2A–2C.

In the loading step, TABL1 and TABL2 are the data tables for files 1 and 2 (block 10).
Read entire file LIST1 data into TABL1
Read entire file LIST2 data into TABL2

Next, various tables and counters are initialized. KEY1 and KEY2 are the key-index files loaded in blocks 100 and 250; MATCOUNT and MATCH are the match counter and table; CMIS2 and TMIS2 are the counter and table for records in TABL2 that have no counterpart in TABL1 (block 200); and CMIS1 and TMIS1 are the corresponding counter and table for TABL1. The symbol ' ' stands for "null".
KEY1=' '
KEY2=' '
TMIS1=' '
TMIS2=' '
MATCH=' '
CMIS1=0
CMIS2=0
MATCOUNT=0

In the first pass, the first key-index file is formed from TABL1 (TABL1.0 contains the number of entries).

```
DO I = 1 to TABL1.0
    KEY = SUBSTRING(TABL1.I,1,3)
    KEY1.KEY = I
END
```

The following block of pseudocode corresponds to blocks 200 and 250 in FIG. 2B, forming the match and second mismatch tables during the second pass.

```
DO I = 1 to TABL2.0
    KEY1 = SUBSTRING(TABL2.I,1,3)
    IF KEY.KEY1 = ' '
        THEN DO
            CMIS2 = CMIS2 + 1
            TMIS2.CMIS2 = TABL2.I
        END
    ELSE DO
        MATCOUNT = MATCOUNT + 1
        MATCH.I = TABL2.I
    END
    KEY2.Key1 = I
END
```

The Statement 'KEY1 = SUBSTRING(TABL2.I,1,3)' corresponds to Block 210 and the statement IF KEY.KEY1 = ' ' corresponds to the testing or interrogating step in Block 220.

In the third pass, the first mismatch table is formed.

```
DO I = 1 to TABL1.0
    KEY = SUBSTRING(TABL1.I,1,3)
    IF KEY2.KEY = ' '
        THEN DO
            CMIS1 = CMIS1 + 1
            TMIS1.CMIS1 = TABL1.I
        END
END
```

Those skilled in the art will appreciate that the invention may be practiced with any number of interpreters or compilers that provide for a lookup function based on the index substitution procedure described above. The invention will be practiced more efficiently if the operating environment provides for dynamic allocation of memory, rather than for allocation at compile time, but this is not essential for the practice of the invention in its broadest form.

The invention is also compatible with different methods of assigning memory locations to variables. The old method of allocating a block of memory of sufficient size to hold the expected array will work, though such a method will ordinarily not use memory efficiently. A simple and appealing method is to treat array elements no differently than single variables—i.e. in an interpreted language, the compiler assigns a memory location to each new array element as it is encountered, without attempting to locate array elements contiguously in memory.

Those skilled in the art will readily appreciate that different tables may be combined; e.g. the match table could contain the numbers of corresponding records in the case of a match and a number and a null for a mismatch; and the following claims are not intended to be limited to the specific embodiments disclosed.

We claim:

1. A method of comparing in a data processing system a first file of data and a second file of data in only one pass through each of said first and second files, each of said first and second files comprising a set of records, each record including a key, comprising the steps of:

initializing and loading a set of at least one data table including at least the step of loading a first key-index table with a first key-index record corresponding to each record in said first file in a first data pass, said first key-index record having a first interrogation index element related in a one to one correspondence to a first-file key of said first file;

sequentially fetching a second-file key from a record in said second file in a second data pass; interrogating a corresponding record in said first key-index table having a second interrogation index element related to said second-file key and to said first interrogation index element; and storing data representative of a matching relationship between said record of said first file and said record of said second file.

2. A method according to claim 1, in which said interrogation index, said first-file key, and said second-file key are alphanumeric.

3. A method according to claim 1, in which at least one of said first-file key and second-file key are formed from at least two non-contiguous characters selected from records in said first file or said second file.

4. A method according to claim 2, in which at least one of said first-file key and said second-file key are formed from at least two non-contiguous characters selected from records in said first file or said second file.

5. A method according to claim 1, in which said data representative of the relationship between said record of said first file and said record of said second file comprises a set of match pointers pointing to matching records in said first file and said second file.

6. A method according to claim 2, in which said data representative of the relationship between said record of said first file and said record of said second file comprises a set of match pointers pointing to matching records in said first and second files.

7. A method according to claim 1, in which said data representative of the relationship between said record of said first file and said record of said second file comprises a set of mismatch pointers pointing to records in said second file lacking a matching record in said first file.

8. A method according to claim 2, in which said data representative of the relationship between said record of said first file and said record of said second file comprises a set of mismatch pointers pointing to records in said second file lacking a matching record in said first file.

9. A method according to claim 5, in which said data representative of the relationship between said record of said first file and said record of said second file further comprises a set of mismatch pointers pointing to records in said second file lacking a matching record in said first file.

10. A method according to claim 6, in which said data representative of the relationship between said record of said first file and said record of said second file further comprises a set of mismatch pointers pointing to records in said second file lacking a matching record in said first file.

11. A method according to claim 1, in which at least one of said first-file key and second-file key are formed from at least one field selected from records in said first file or said second file containing a plurality of fields.

12. A method according to claim 11, in which said data representative of the relationship between said record of said first file and said record of said second file comprises a set of match pointers pointing to matching records in said first and second files.

13. A method according to claim 11, in which said data representative of the relationship between said record of said first file and said record of said second file comprises a set of mismatch pointers pointing to records in said second file lacking a matching record in said first file.

14. A method according to claim 2, in which at least one of said first-file key and second-file key are formed from at least one field selected from records in said first file or said second file containing a plurality of fields.

15. A method according to claim 14, in which said data representative of the relationship between said record of said first file and said record of said second file comprises a set of match pointers pointing to matching records in said first and second files.

16. A method according to claim 14, in which said data representative of the relationship between said record of said first file and said record of said second file comprises a set of mismatch pointers pointing to records in said second file lacking a matching record in said first file.

17. A method according to any of claims 1–16, further including the step of forming a new file containing only records common to both said first and said second files.

18. A method according to claim 1, further comprising the steps of:

loading a second key-index table with a second key-index record corresponding to each record in said second file in said second data pass, said second key-index record having an interrogation index related to a second-file key of said second file;

sequentially fetching a first-file key from a record in said first file in a third data pass; interrogating a corresponding record in said second key-index table having an interrogation index element related in a one to one correspondence to said first-file key; and storing data representative of the relationship between said record of said first file and said record of said second file.

19. A method according to claim 18, in which said interrogation index, said first-file key, and said second-file key are alphanumeric.

20. A method according to claim 18, in which at least one of said first-file key and second-file key are formed from at least two non-contiguous characters selected from records in said first file or said second file.

21. A method according to claim 19, in which at least one of said first-file key and second-file key are formed from at least two non-contiguous characters selected from records in said first file or said second file.

22. A method according to claim 18, in which said data representative of the relationship between said record of said first file and said record of said second file comprises a set of pointers pointing to corresponding records in said first and second files.

23. A method according to claim 19, in which said data representative of the relationship between said record of said first file and said record of said second file comprises a set of corresponding pointers pointing to corresponding records in said first and second files.

24. A method according to claim 18, in which said data representative of the relationship between said record of said first file and said record of said second file comprises a set of mismatch pointers pointing to records in said second file lacking a corresponding record in said first file and to records in said first file lacking a corresponding record in said second file.

25. A method according to claim 19, in which said data representative of the relationship between said record of said first file and said record of said second file comprises a set of mismatch pointers pointing to records in said second file lacking a corresponding record in said first file and to records in said first file lacking a corresponding record in said second file.

26. A method according to claim 22, in which said data representative of the relationship between said record of said first file and said record of said second file further comprises a set of mismatch pointers pointing to records in said second file lacking a corresponding record in said first file and to records in said first file lacking a corresponding record in said second file.

27. A method according to claim 23, in which said data representative of the relationship between said record of said first file and said record of said second file further comprises a set of mismatch pointers pointing to records in said second file lacking a corresponding record in said first file and to records in said first file lacking a corresponding record in said second file.

28. A method according to any of claims 18–27, further including the step of forming a new file containing only records common to both said first and said second files.

29. A method of comparing in a data processing system a first file of data and a second file of data, each of said first and second files comprising a set of records, each record including a key, comprising the steps of:

in a first data pass initializing and loading a set of at least one data table including at least the step of loading a first key-index table with a first key-index record corresponding to each record in said first file, said first key-index record having a first interrogation index element related in a one to one correspondence to a first-file key of said first file;

in a second data pass, sequentially fetching a second-file key from a record in said second file; interrogating a corresponding record in said first key-index table having a second interrogation index element related in a one to one correspondence to said second-file key and to said first interrogation index element; and storing data representative of a matching relationship between said record of said first file and said record of said second file;

in a third data pass, initializing and loading a set of at least one data table including at least the step of loading a second key-index table with a second key-index record corresponding to each record in said second file, said second key-index record having an interrogation index related in a one to one correspondence to a second-file key of said second file;

in a fourth data pass, sequentially fetching a first-file key from a record in said first file; interrogating a corresponding record in said second key-index table having an interrogation index element related in a one to one correspondence to said first-file key; and storing data representative of the relationship between said record of said first file and said record of said second file.

30. A method according to claim 29, in which said second data pass is effected by reading said second file from non-volatile storage to fetch said second-file key; and said fourth data pass is effected by reading said first file from non-volatile storage to fetch said first-file key, whereby said first and second files are not loaded into said memory.

31. A method according to claim 30, in which said first data pass is effected by reading said first file from non-volatile storage to load said first key-index table; and said third data pass is effected by reading said second file from non-volatile storage to load said second key-index table, whereby said first and second files are not loaded into said memory.

32. A method according to any of claims 29–31, in which said interrogation index, said first-file key, and said second-file key are alphanumeric.

33. A method according to claim 29, in which at least one of said first-file key and second-file key are formed from at least two non-contiguous characters selected from records in said first file or said second file.

34. A method according to claim 32, in which at least one of said first-file key and second-file key are formed from at least two non-contiguous characters selected from records in said first file or said second file.

35. A method according to claim 29, in which said data representative of the relationship between said record of said first file and said record of said second file comprises a set of pointers pointing to corresponding records in said first and second files.

36. A method according to claim 32, in which said data representative of the relationship between said record of said first file and said record of said second file comprises a set of corresponding pointers pointing to corresponding records in said first and second files.

37. A method according to claim 29, in which said data representative of the relationship between said record of said first file and said record of said second file comprises a set of mismatch pointers pointing to records in said second file lacking a corresponding record in said first file.

38. A method according to claim 32, in which said data representative of the relationship between said record of said first file and said record of said second file comprises a set of mismatch pointers pointing to records in said second file lacking a corresponding record in said first file.

39. A method of comparing in a data processing system a first file of data and a second file of data, each of said first and second files comprising a set of records, each record including a key, comprising the steps of:

in a first data pass, reading said first file from non-volatile storage and loading a set of at least one data table in memory including at least the step of loading a first key-index table with a first key-index record corresponding to each record in said first file, said first key-index record having a first interrogation index element related in a one to one correspondence to a first-file key of said first file;

in a second data pass, reading said second file from non-volatile storage and loading a set of at least one data table in memory including at least the step of loading a second key-index table with a second key-index record corresponding to each record in said second file, said second key-index record having a second interrogation index element related in a one to one correspondence to a second-file key of said second file and to said first interrogation index element;

in a third data pass, sequentially fetching from non-volatile storage a first-file key from a record in said first file;

interrogating a corresponding record in said second key-index table having an interrogation index element related in a one to one correspondence to said first-file key; and storing data representative of a matching relationship between said record of said first file and said record of said second file;

in a fourth data pass, sequentially fetching from non-volatile storage a second-file key from a record in said second file;

interrogating a corresponding record in said first key-index table having an interrogation index element related in a one to one correspondence to said second-file key; and storing data representative of the relationship between said record of said first file and said record of said second file.

40. A method according to claim 39, in which said second data pass is effected by reading said second file from non-volatile storage to fetch said second-file key; and said fourth data pass is effected by reading said first file from non-volatile storage to fetch said first-file key, whereby said first and second files are not loaded into said memory.

41. A method according to claim 40, in which said first data pass is effected by reading said first file from non-volatile storage to load said first key-index table; and said third data pass is effected by reading said second file from non-volatile storage to load said second key-index table, whereby said first and second files are not loaded into said memory.

42. A method according to any of claims 39–41, in which said interrogation index, said first-file key, and said second-file key are alphanumeric.

43. A method according to claim 39, in which at least one of said first-file key and second-file key are formed from at least two non-contiguous characters selected from records in said first file or said second file.

44. A method according to claim 42, in which at least one of said first-file key and second-file key are formed from at least two non-contiguous characters selected from records in said first file or said second file.

45. A method according to claim 39, in which said data representative of the relationship between said record of said first file and said record of said second file comprises a set of pointers pointing to corresponding records in said first and second files.

46. A method according to claim 42, in which said data representative of the relationship between said record of said first file and said record of said second file comprises a set of corresponding pointers pointing to corresponding records in said first and second files.

47. A method according to claim 39, in which said data representative of the relationship between said record of said first file and said record of said second file comprises a set of mismatch pointers pointing to records in said second file lacking a corresponding record in said first file.

48. A method of comparing in a data processing system a first file of data and a second file of data located in non-volatile storage media, each of said first and second files comprising a set of records, each record including a key, comprising the steps of:

initializing and loading a set of data tables in memory including first and second key-index tables, a match table for storing data representative of records in said first file having a counterpart record in said second file, a first mismatch table for storing data representative of records in said first file lacking a counterpart record in said second file and a second mismatch table for storing data representative of records in said second file lacking a counterpart record in said first file;

sequentially fetching a second-file keyword from a record in said second file, interrogating a corresponding record in said first key-index table having an index element equal to said second-file keyword, and adding a record containing identifying data to said match table when said corresponding record has a non-null entry and adding a record containing identifying data to said second mismatch table when said corresponding record has a null entry; and sequentially fetching a first-file keyword from a record in said first file, interrogating a corresponding record in said second key-index table having an index element equal to said first-file keyword, and adding a record containing identifying data to said first mismatch table when said corresponding record has a null entry.

49. A method according to claim 48, including a preliminary step of reading said first and second files of data from nonvolatile storage into corresponding first and second data tables in memory, each record of said first and second data tables containing at least said key of a corresponding file record;

said step of loading said first key-index table is effected by reading said key for said first data table in a first pass through one of said set of data tables in memory;

said step of repetitively fetching a second-file keyword and interrogating a corresponding record in said first key-index file is effected by reading through said second data table in a second pass through one of said set of data tables in memory; and said step of repetitively fetching a first-file keyword and interrogating a corresponding record in said second key-index file is effected by reading through said first data table in a third pass through one of said set of data tables in memory.

50. A method according to claim 49, in which said first-file keyword, and said second-file keyword are alphanumeric.

51. A method according to claim 50, in which said first-file keyword, and said second-file keyword are alphanumeric.

52. A method according to claim 49, in which at least one of said first-file keyword and second-file keyword are formed from at least two non-contiguous characters selected from records in said first file or said second file.

* * * * *